June 5, 1956
A. E. GERSCH
2,749,041
COUNTING AND CONTROL DEVICE
Filed Nov. 15, 1954
4 Sheets-Sheet 1
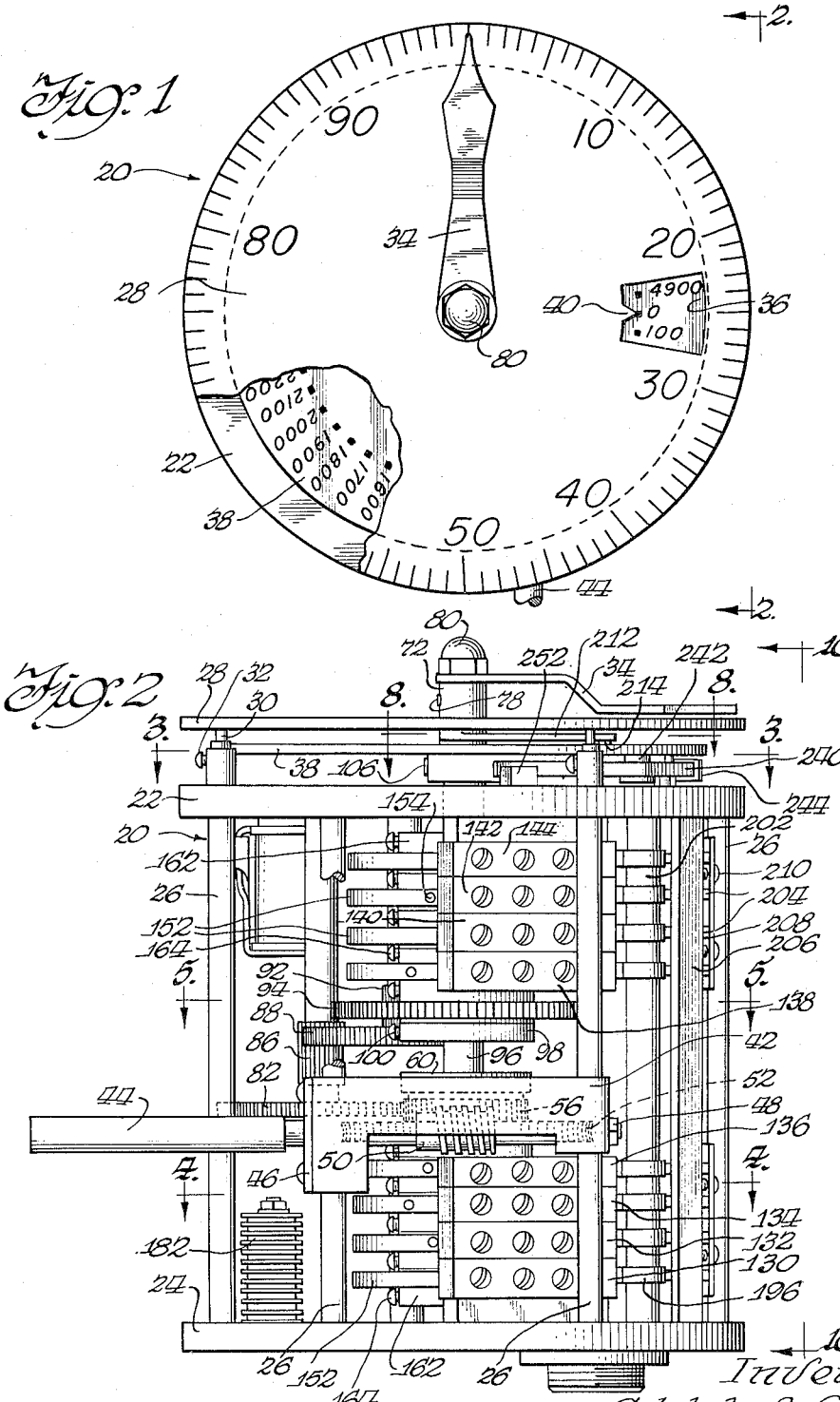
Inventor
Adolph E. Gersch
by Moore, Prangley & Clayton
Attys.

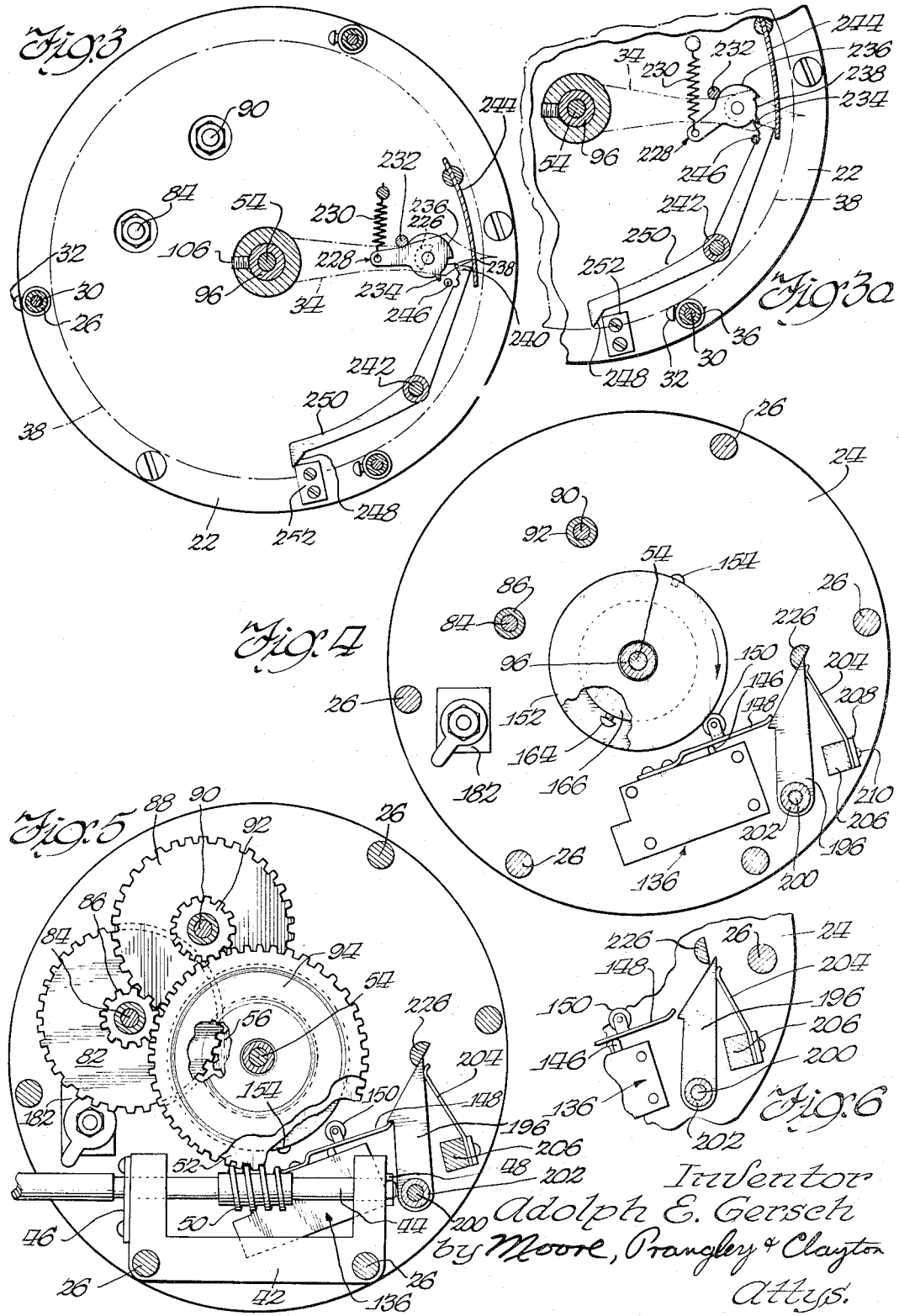

June 5, 1956  A. E. GERSCH  2,749,041
COUNTING AND CONTROL DEVICE
Filed Nov. 15, 1954  4 Sheets-Sheet 3
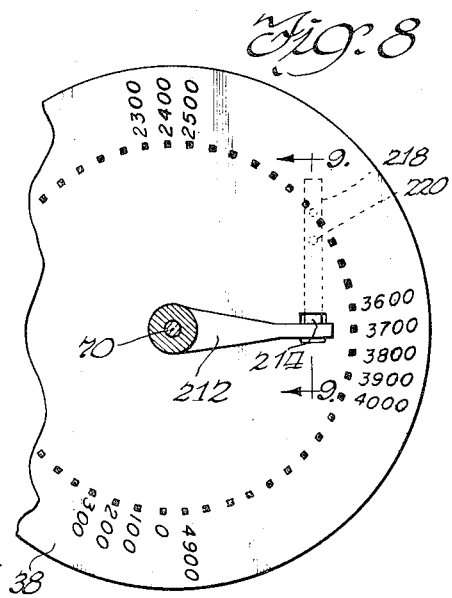
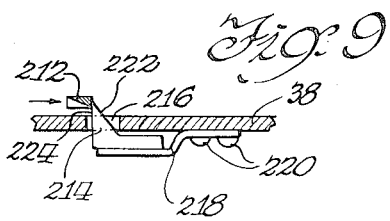
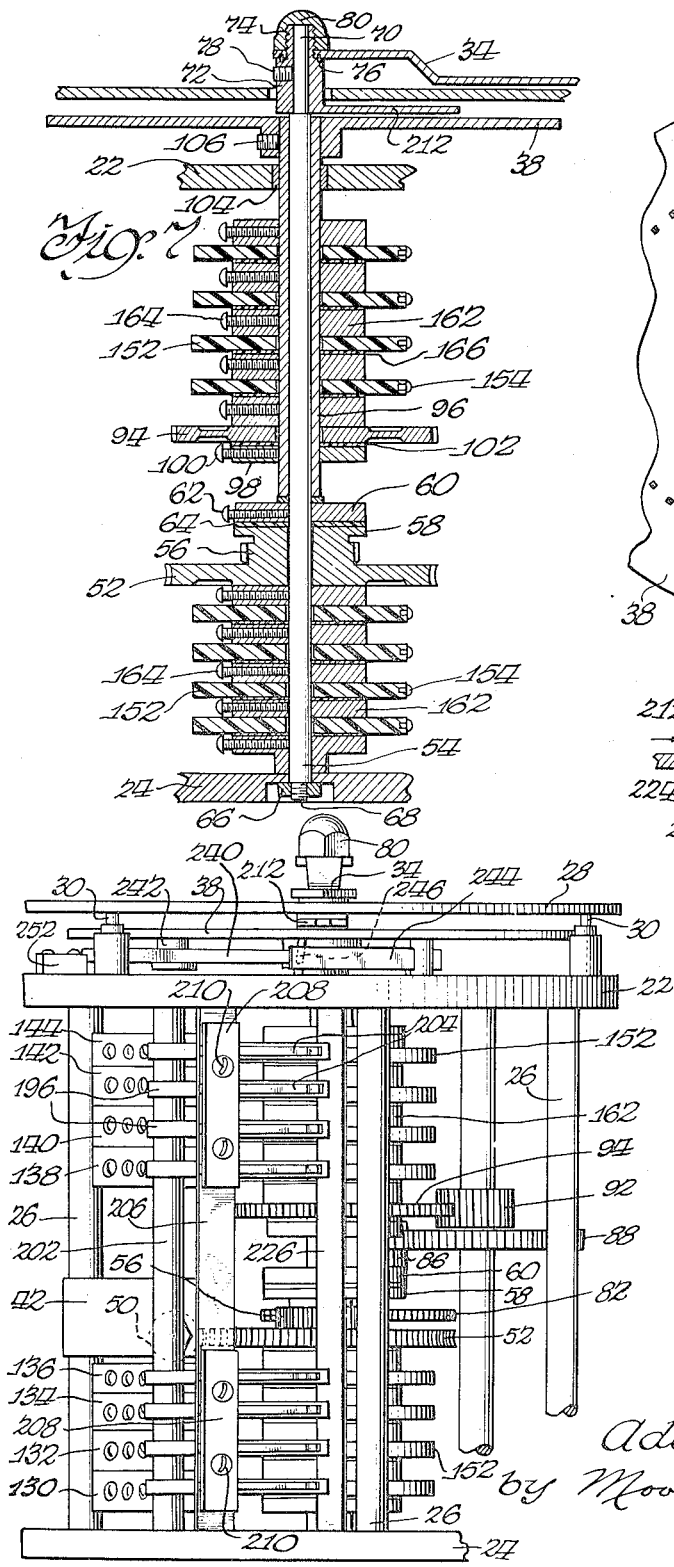
Inventor
Adolph E. Gersch
by Moore, Prangley & Clayton
attys.

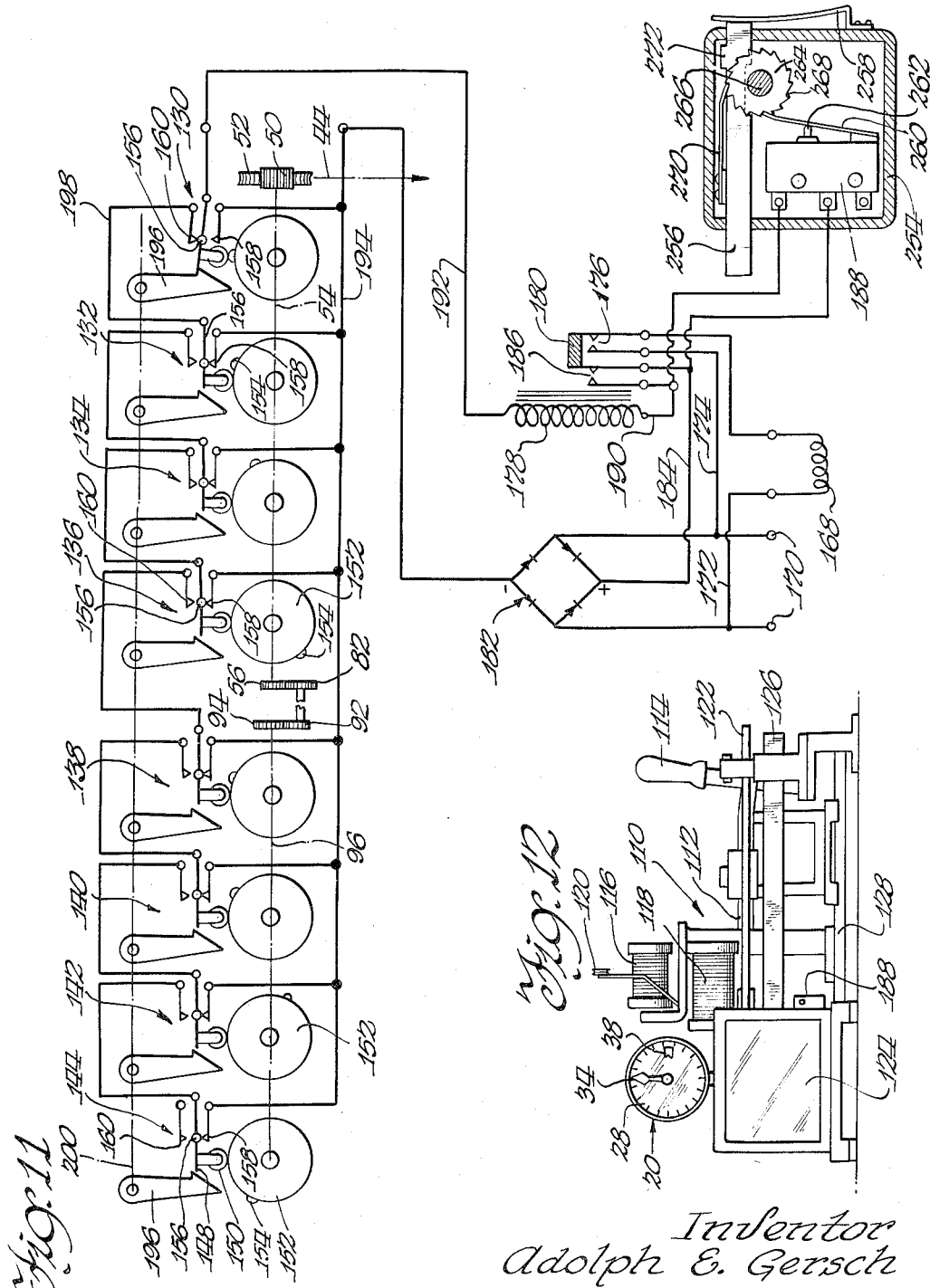

United States Patent Office 2,749,041
Patented June 5, 1956

2,749,041
COUNTING AND CONTROL DEVICE

Adolph E. Gersch, Chicago, Ill., assignor to Geo. Stevens Manufacturing Company, Chicago, Ill., a corporation of Illinois Application November 15, 1954, Serial No. 468,679

10 Claims. (Cl. 235—132)

This invention relates to combined counting and control devices and more particularly to devices wherein the control signal is generated at predetermined points in the operation of the counting device.

In certain types of machines a particular operation is repeated many times and it is desirable to control the machine or its feed after a predetermined number of operations have taken place. To this end the machines are provided with counters which count the number of repetitious operations, the machine being stopped manually when a predetermined number of the repetitious operations have been completed. The machine is then adjusted and operation begun again to perform another set of repetitious operations which may be equal in number or different in number from the previously completed repetitious operations. Manual control of machines of this kind is costly and time consuming and errors tend to occur particularly when the number of operations in successive groups is different. Automatic controls for such machines that have been utilized heretofore are also very expensive and complicated in construction, operation and maintenance.

An example of machines of this character are winding machines for manufacturing electrical coils made up of a series of windings. The electrical characteristics of these coils are determined in part by the number of turns in each coil and, accordingly, if the electrical properties of the finished coil are to be controlled with any degree of accuracy, the number of turns must be accurately controlled. It is also common to have a series of interconnected coils wound on the same coil core, the coil sections being spaced apart and each containing a certain predetermined number of turns. The mechanism of this invention is particularly adapted for use with such machines to control the turns in each coil or coil section in a semi-automatic manner. Although the invention has particular applicability to such machines, it is to be understood that the invention can be utilized in other machines in which repetitious operations occur.

Accordingly, it is an object of the present invention to provide an improved counter and particularly an improved counter having a control device associated therewith and operated thereby.

A further object of the invention is to provide an improved control apparatus and circuit in connection with a counter, which control apparatus is capable of producing a control signal at a plurality of predetermined positions of the associated counter.

Yet another object of the present invention is to provide an improved drive mechanism in a combined counter and control device of the type set forth.

Still another object of the invention is to provide an improved reset structure in a counter and control device of the type described.

These and other objects and advantages of the invention will be better understood from the following description when taken in conjunction with the accompanying drawings. In the drawings wherein like reference numerals have been utilized to indicate like parts throughout:

Fig. 1 is an elevational view of the dial of the improved counter of the present invention, a portion of the forward dial being broken away to reveal the construction of the rear dial;

Fig. 2 is a side elevational view of the counter and control device of Fig. 1 substantially as seen in the direction of the arrows along the line 2—2 of Fig. 1;

Fig. 3 is a view in section substantially as seen in the direction of the arrows along the line 3—3 of Fig. 2 and illustrating a portion of the reset mechanism;

Fig. 3a is a partial sectional view similar to Fig. 3 and showing the parts at a different point in the reset operation;

Fig. 4 is a view in section substantially as seen in the direction of the arrows along the line 4—4 of Fig. 2;

Fig. 5 is a view in section substantially as seen in the direction of the arrows along the line 5—5 of Fig. 2 and illustrating the drive mechanism;

Fig. 6 is a partial view similar to Fig. 4 and showing the parts in the resetting position;

Fig. 7 is a partial view in section taken along the axis of the counting and control device of Fig. 1 and illustrating the drives to the two cooperating counter dials;

Fig. 8 is a partial view in section substantially as seen in the direction of the arrows along the line 8—8 of Fig. 2 and illustrating a portion of the reset mechanism;

Fig. 9 is a partial enlarged view in section of a portion of the reset mechanism substantially as seen in the direction of the arrows along the line 9—9 of Fig. 8;

Fig. 10 is a partial view in elevation of the counter and control device substantailly as seen in the direction of the arrows along the line 10—10 of Fig. 2;

Fig. 11 is a schematic electrical circuit illustrating the connections and operation of the control device of this invention; and Fig. 12 is an elevational view of a coil winder on which the counter and control device of the present invention has been installed.

Referring first to Figs. 1 and 2, the general construction of the counter and control device of this application will be described. The device is generally designated by the numeral 20 and includes a front base plate 22 from which is spaced a back base plate 24, the base plates being connected by five rods 26 which extend between the base plates 22 and 24 to complete the frame.

The counting portion of the device 20 is positioned at the upper end as viewed in Fig. 2 and includes a fixed outer dial 28 which is mounted by three posts 30 which are adjustably received in certain of the rods 26, the position of the posts 30 and accordingly the distance between dial 28 and base plate 22 being adjustable by a plurality of set screws 32. Dial 28 is circular in shape and has printed thereon a linear scale, circular in form, and reading from zero to 100. A pointer 34 cooperates with outer dial 28 to form one part of the counter.

An aperture 36 is formed in dial 28 and through aperture 36 is visible a second movable dial 38. A pointer 40 formed on outer dial 28 extends into aperture 36 and serves as an indicator for the movable dial 38. Dial 38 also is provided with a linear, circularly arranged, scale numbered from zero to 4,900 in 100 unit intervals. The highest possible reading on dial 38 is 5,000. As will be explained more fully hereafter, one complete revolution of pointer 34 with respect to outer dial 28 causes movement of dial 38 from one marker to the adjacent marker. Accordingly the combined dials 28 and 38 can indicate events at intervals of from zero to 5,000 by cooperation therebetween.

The drive for pointer 34 and movable dial 38 can be best seen in Figs. 2, 5 and 7. Mounted between two of the rods 26 and spaced a short way away from base plate 24 is a U-shaped bracket 42 which supports a shaft 44 which serves as the input shaft to the counter and control device 20. Input shaft 24 is driven by the prime mover of the machine on which the counter and control device is mounted. For example if the device is mounted on and is used with a coil winding machine, shaft 44 would be driven from and at the same rate as the core on which the coils are wound. Shaft 44 is maintained on bracket 42 by a bearing plate 46 and nut 48.

Mounted on shaft 44 and within bracket 42 is a worm 50 which meshes with a worm gear 52 which is rotatably mounted on and rotates with respect to a central shaft 54 extending the length of the counter. Formed integrally with worm gear 52 and rotating therewith is a smaller gear 56 and a friction drive plate 58. Positioned adjacent drive plate 58 but spaced therefrom is a collar 60 secured to shaft 54 by a set screw 62. A body of friction or clutch material is interposed between collar 60 and drive plate 58 to provide a friction member 64. The presence of friction member 64 makes it possible to drive shaft 54 from input shaft 44. The described drive connection also permits shaft 54 to be rotated when shaft 44 and the associated worm and gear are held stationary.

Referring particularly to Fig. 7, it will be seen that the lower end of shaft 54 is provided with a nut 66 cooperating with a threaded section 68 to hold this end of shaft 54 on base plate 24. The upper end of shaft 54 has a reduced portion 70 which receives a hub 72 having a threaded upper end 74. Counter 34 has an aperture therein fitting over threaded end 74 and a series of locating pins 76 properly positioned on indicator 34 with respect to hub 72. A set screw 78 fixedly attaches hub 72 to portion 70 of shaft 54 and a threaded cap 80 firmly holds indicator 34 in position against hub 72. From the above description it will be seen that rotation of input shaft 44 will drive indicator 34 around outer dial 28 through the friction member 64.

Since outer dial 28 is calibrated from zero to 100 and inner dial 38 is calibrated from zero to 5,000 at 100 unit intervals, it is necessary to drive inner dial 38 at one-fiftieth the rate of indicator 34. To this end a gear reduction train is provided which can be best seen in Figs. 2 and 5. Input to the gear reduction train is taken from gear 56 which meshes with a larger gear 82 mounted on a shaft 84. Also affixed to shaft 84 is a smaller and elongated gear 86 which is driven by shaft 84 and meshes with and drives a larger gear 88 mounted on the shaft 90. Also mounted on shaft 90 and driven thereby is a smaller gear 92 which meshes with and drives a larger gear 94. Gear 94 is mounted on but is free to rotate with respect to a sleeve 96 surrounding and supported by the drive shaft 54 (see Fig. 7). Positioned beneath gear 94 as viewed in Fig. 7, is a collar 98 which is fixedly attached to sleeve 96 by a set screw 100. Positioned between collar 98 and gear 94 is a friction member 102 similar to friction member 64. Rotation of gear 94 drives sleeve 96 through friction member 102. However sleeve 96 is free to rotate even though gear 94 is held stationary provided the frictional force presented by friction member 102 is overcome.

Sleeve 96 intermediate its ends is supported by a bearing 104 positioned in base plate 22. Affixed to the upper end of sleeve 96 is the movable inner dial 38 which is affixed to sleeve 96 by a set screw 106. From the above described gear train it will be seen that movable dial 38 will be rotated counterclockwise at one-fiftieth the rate that indicator 34 is rotated clockwise as viewed in Fig. 1.

Referring now to Fig. 12 a typical use of the counter and control device 20 will be explained. The counter is mounted upon and associated with a coil winding machine generally designated by the numeral 110. Machine 110 is adapted to wind a coil consisting of several hundred or several thousand turns, the coil core being supported by a mount 112 which is operated by handle 114. Wire from spools 116 and 118 is passed over a guide such as guide 120 and other guides positioned upon bar 122 to be wound upon a core carried by mount 112.

Mount 112 is rotatably driven by a prime mover and a suitable gear train mounted within a housing 124. The prime mover and gearing are adapted to drive mount 112 and the core thereon at a predetermined rate and, in addition, to move the core in a transverse direction by moving bar 126 along supporting rails 128, mount 112 being fixed to bar 126.

This type of coil winding machine 112 is particularly adapted to wind coils having a plurality of spaced apart coil sections mounted on the same core, the coil sections being interconnected and formed from a continuous strand of wire. The electrical characteristics of the finished coil and the characteristics of each coil section will be a function of the number of turns in the coil and each coil section. Accordingly it is desirable to provide means preferably automatic to stop operation of the coil winding machine when the desired number of turns of the coil have been wound and in the case of multiple coil sections on the same core when the desired number of turns have been wound for each section. The coil sections on the multiple section coil may contain the same number of turns or each coil section may contain a different number of turns. Accordingly it is desirable that means be provided to control the operation of the coil winding machine 110 so that operation thereof is ceased after the winding of each predetermined coil section.

To this end the housing 124 includes either a clutch connecting the prime mover to mount 112 which is electrically operated together with an electrically operated brake or a switch to deenergize the prime mover together with a brake to stop motion of the prime mover and mount 112 when desired.

Operation of the brake and clutch or operation of the brake and simultaneous deenergization of the prime mover can be accomplished after winding a predetermined number of turns on a coil or coil section by using the present invention. This is accomplished in the present invention by providing a plurality of switches which are actuated by the counter at predetermined positions of the counter indicators, the signal from the switches being utilized to operate the brake solenoid, the clutch solenoid or to open the circuit energizing the prime mover.

A first set of switches including switches 130, 132, 134 and 136 is mounted on base plate 24 (see Figs. 2 and 10). A second set of switches including switches 138, 140, 142 and 144 is mounted on base plate 22. All of the switches are identical in construction and accordingly one typical switch, namely switch 136, will be described in detail. Referring to Fig. 4 it will be seen that switch 136 has an actuator 146 which is in contact with a spring arm 148 which normally bears against the end of actuator 146 and is adapted to move actuator 146 inwardly and downwardly as viewed in Fig. 4 when arm 148 is moved downwardly. Intermediate the ends of arm 148 and mounted thereon is a rotatable wheel 150 which bears against an actuating disc 152 which is mounted upon but is free to rotate with respect to sleeve 96. Positioned on the circumference of disc 152 and extending outwardly therefrom is a cam pin 154. An actuating disc 152 and a cam pin 154 is provided for each of switches 130 through 144.

Referring to the schematic electrical diagram of Fig. 11, it will be seen that switch 136 is a double throw switch having two contacts between which is mounted a movable contact. The center movable contact 156 is ordinarily pressed against lower contact 158 but is movable out of contact with contact 158 and against upper contact 160 when actuator 146 is pressed inwardly and downwardly as viewed in Fig. 4. Accordingly movable contact 156 will be against contact 158 when wheel 150 rests against the periphery of disc 152. Contact of cam pin 154 with wheel 150 moves arm 148 and actuator 146 downwardly as viewed in Fig. 4 causing movable contact 156 break connection with contact 158 and move into connection with contact 160.

Referring now to Fig. 7 the manner of driving and rotating the actuator discs 152 will be described. A plurality of collars 162 is fixedly attached to sleeve 96 by set screws 164. Each actuator disc 152 is positioned between a pair of collars 162. Positioned between discs 152 and the collars 162 are friction washers 166 which form a driving connection between collars 162 and actuator discs 152. Accordingly rotation of sleeve 96 causes positive rotation of the collars 162 attached thereto and collars 162 through the action of friction washers 166 drive the discs 152. The frictional drive does permit the position of the cam pins 154 to be adjusted with respect to the periphery of sleeve 96 so that the time or point at which switch 136 and the other switches are actuated can be adjusted.

It is to be understood that each of the other seven switches is provided with an actuator disc and cam which are driven either from sleeve 96 or shaft 54 as the case may be through the intermediary of a friction washer. Each actuator disc 152 and its associated cam 154 can be adjusted with respect to its supporting shaft.

Referring now to Fig. 11 the manner in which the switches serve to control operation of a machine such as the coil winding machine 110 of Fig. 12 will be described. A control solenoid 168 is shown connected in circuit with the switches. Control solenoid 168 when energized may be used simultaneously to engage a clutch interconnecting the drive motor and the coil core mount 112 of Fig. 12 and disengage a brake to permit rotation of mount 112. Conversely when solenoid 168 is deenergized, the clutch is disengaged and the brake applied. In another type of construction control solenoid 168 may be used to energize the prime mover and simultaneously release a brake to permit rotation of mount 112. In the following description it will be assumed that the coil winding machine 110 is equipped with a clutch and brake assembly which is effective when solenoid 168 is deenergized to disengage the drive from mount 112 and simultaneously apply a brake thereto.

A source of operating potential 170 which may be a 117 volt A. C. supply furnishes power to operate control solenoid 168. More specifically one side of supply 170 is connected through a line 172 to one terminal of solenoid 168 and the other side of supply 170 is connected through a line 174 and a switch 176 to the other side of solenoid 168. The contacts of switch 176 are ordinarily open unless closed by a relay coil 178 which is operative to attract an armature 180 attached to one contact of switch 176. Energization of relay 178 attracts armature 180 closing the contacts of switch 176.

Power for operating relay 178 is derived from a rectifier 182 which is powered from the source 170. One of the output leads of rectifier 182 is connected through a line 184 to one contact of a switch 186 and one terminal of a manual switch 188. The other contact of switch 186 and the other terminal of switch 188 are connected through a line 190 to one terminal of relay 178. The other terminal of relay 178 is connected through a line 192 to the center movable contact 156 on switch 130. The lower contact 158 of switch 130 is connected to a line 194 that is connected to the other output lead of rectifier 182.

Winding movement of machine 110 is begun when solenoid 168 is energized. Solenoid 168 is energized initially by closing manual switch 188. Closure of switch 188 completes a circuit from the lower terminal of rectifier 182 through line 184, switch 188, line 190, relay 178, line 192, switch 130 (assuming that the center contact 156 is against contact 158) and line 194 back to the other side of rectifier 182. This causes energization of relay 178 and moves armature 180 to the left as viewed in Fig. 11. This closes switch 176 and establishes a circuit from source 170 through line 174 to energize control solenoid 168.

Energization of relay 178 also closes switch 186 whose contacts are in parallel with the contacts of switch 188 to keep relay 178 energized, switch 186 acting as a holding switch. The control solenoid 168 will be energized and machine 110 will continue to wind turns upon a core until the central contact 156 of switch 130 is moved out of contact with switch contact 158. When the lower section of switch 130 is opened (that is when center contact 156 moves away from contact 158) coil 178 is deenergized, armature 180 moves to the right opening switch 176 and deenergizing control solenoid 168. Since the opening of switch 130 is controlled by the position of cam pin 154 with respect to shaft 54 and since shaft 54 is connected to pointer 34, switch 130 can be opened at any chosen position of pointer 34 and therefore after any predetermined number of turns have been wound on the core mounted on machine 110. It will be seen therefore that operation of machine 110 will be interrupted after a predetermined number of turns have been wound on the core positioned on mount 112. If only a single coil section is to be wound on the core, the core can be removed from the machine and a new core placed thereon to receive a coil. If on the other hand a second connected coil section is to be wound on the same core but spaced from the first coil section the rack 126 can be adjusted to a point so that the second coil section can be wound on the core at a predetermined point with respect to the first coil section. Coiling is resumed by manually closing switch 188 after which the machine will operate automatically until a predeterminde number of coils is wound on the core, operation of the machine being interrupted by operation of switch 132 after a predetermined number of turns as determined by the positioning of the associated cam 154 have been wound upon the core.

In order to wind a different number of turns in the second connected coil section it is desirable to render switch 130 inoperative during winding of the second coil section and permit the winding operation to be controlled by switch 132. To this end movable contact 156 of switch 130 is held against upper contact 156 (as viewed in Fig. 11) by a latch 196 which engages the end of arm 148 (see Fig. 4 also). A line 198 connects contact 160 of switch 130 to the center movable contact 156 of switch 132. The lower contact 158 of switch 132 is connected to the line 194 and thence to the rectifier 182. The succeeding switches are similarly connected so that movement of the switch when the wheel 150 thereof encounters cam 154 connects the succeeding switch to the rectifier 182.

The other switches are also provided with latches 194 so that a switch once actuated remains actuated permitting the next switch to control the operation of the coiling machine.

Referring now to Figs. 4, 5 and 6, the construction and operation of latch 196 will be described more fully. One end of each latch 196 has an aperture therein to receive a shaft 200, latches 196 being free to pivot with respect to shaft 200. A plurality of spacers 202 space the various latches 196 along shaft 200. Means is provided to hold latch 196 in position to latch arm 148 in the form of a spring 204 mounted on a bar 206 extending between the base plates 22 and 24. A strap 208 is secured to bar 206 by a plurality of screws 210 to hold the springs 204 in position on bar 206. Springs 204 normally urge the associated latches 196 in a counterclockwise direction as viewed in Fig. 4 and hold them in readiness to latch arms 148 when cam pins 154 engage wheels 150 on arms 148. Latches 196 serve to hold the associated switch in the upper position as viewed in Fig. 11 until resetting is accomplished.

After a coil has been fully wound and finished and has been removed from mount 112 (see Fig. 12) it is desirable to reset indicator 34 and movable dial plate 38 to the zero position and simultaneously reset each of switches 130 to 144 to the condition wherein movable contact 156 is in connection with lower contact 158 as viewed in Fig. 11, i. e., arm 148 is released from latch 196 (see Fig. 4, also). Resetting in the present invention is accomplished manually by turning pointer 34 and its associated parts in a counterclockwise direction until the pointer reaches zero and thereafter turning pointer 34 another full 360 degrees of revolution counterclockwise until the pointer again arrives at zero. Resetting of indicator 34 is automatically accomplished by this manual movement.

Suitable connections are made between indicator 34 and movable dial 38 so that the above described movement of indicator 34 also resets dial 38 to zero. The structure for accomplishing this is best illustrated in Figs. 7, 8 and 9 of the drawings. An arm 212 is formed integral with hub 72 and is oriented so that it lies directly beneath indicator 34 but behind outer dial 28. The shape of arm 212 as seen in a plan view is best illustrated in Fig. 8. By reference to Fig. 7 it will be seen that arm 212 lies between stationary dial 28 and movable dial 38. Mounted on the face of movable dial 38 opposite arm 212 is a latch 214 (see Fig. 9) extending through an aperture 216 in plate 38. Latch 214 is mounted on a spring arm 218 that is in turn fastened to dial 38 such as by fasteners 220. One edge of latch 214 is beveled to form a cam surface 222 so that when arm 212 contacts surface 222, latch 214 is cammed downwardly as viewed in Fig. 9 out of the path of arm 212 to permit independent operation of indicator 34 and dial 38 in a counting or clockwise movement of indicator 34 as viewed in Fig. 1. There also is formed on latch 214 an engaging surface 224 which is disposed substantially perpendicular to the surface of dial 38 and perpendicular to the direction of travel of arm 212. When arm 212 is moved in a resetting direction it abuts against surface 224 and thus carries dial 38 with it in a resetting direction. Latch 214 is disposed 90 degrees away from the zero point on dial 38 in a counterclockwise direction as viewed in Fig. 1 so that the zero point on dial 38 will be properly aligned with pointer 40 when resetting is completed.

It is to be noted that the resetting of indicator 34 and dial 38 by turning these members in a counterclockwise direction can be accomplished without disengaging any of the gear train attached to input shaft 44. This results from the friction drive between the gear train connected to input shaft 44 and the indicator shaft 54 and dial sleeve 96.

As a part of the resetting movement it is desirable to disengage latches 196 from the associated switch arms 148 (see Figs. 4 to 6). The mechanism for accomplishing this is best illustrated in Figs. 3 and 3a of the drawings. There is provided a latch release bar 226 (see Fig. 4) which extends between base plates 22 and 24 and beyond base plate 22 toward movable dial 38. As is best seen in Fig. 4 the portion of latch release bar 226 disposed between base plates 22 and 24 is substantially semi-circular in cross section, the flat side of bar 226 engaging the nose of latch 196 and lying substantially parallel to and in line with the engaged surface of latch 196. When bar 226 is rotated in a counterclockwise direction about its axis to the position illustrated in Fig. 6 of the drawings, the latch 196 is pivoted about shaft 200 against the action of spring 204 a distance sufficient to clear the end of arm 148 thereby resetting the associated switch so that the center contact 156 connects with the lower contact 158 as viewed in Fig. 11.

The necessary counterclockwise rotation to release bar 226 is accomplished by the mechanism illustrated in Figs. 3 and 3a of the drawings. The portion of bar 226 extending beyond base plate 22 toward dial 38 carries a latch release cam 228 which is fixedly attached thereto. A spring 230 normally urges cam 228 and the attached bar 226 in a clockwise direction as viewed in Fig. 3, the clockwise movement being limited by a pin 232 mounted on base plate 22. Extending outwardly from cam 228 is a short finger 234 and a cam shoulder 236, cam 228 being recessed as at 238 between finger 234 and cam surface 236.

Resetting movement of cam 228 and the attached bar 226 is accomplished by a release pawl 240 which is pivoted upon a shaft 242 mounted on the lower face of dial 38 as viewed in Fig. 2. Also mounted on the lower face of dial 38 is a leaf spring 244 bearing against pawl 240 and urging pawl 240 in a counterclockwise direction about shaft 242 and against a pin 246 also carried by the lower face of dial 38. During resetting movement, dial 38 and the attached parts including pawl 240 are rotated in a counterclockwise direction as viewed in Fig. 3. When pawl 240 engages finger 234, cam 228 is rotated in a counterclockwise direction thus moving bar 226 in a counterclockwise direction to release the switch arms 148 from the latches 196.

While the nose of pawl 240 is engaging finger 234 on cam 228 a cam surface 248 on an arm 250 pivoted at point 242 and formed integral with pawl 240 is engaging a camming block 252 which is mounted on base plate 22. After the switch arms 148 have been released from latches 196 but while pawl 240 is in engagement with finger 234, cam surface 248 engages camming block 252 to move pawl 240 out of engagement with finger 234. This permits the parts to move to a position placing them in condition for another winding operation by permitting spring 230 to move cam 228 and its associated parts in a counterclockwise direction until cam 228 rests against pin 232.

The parts are fully reset with indicator 34 at zero on dial 28 and the zero marker on dial 38 under pointer 40 when the parts are in the condition shown in Fig. 3. More particularly the nose of pawl 240 is positioned opposite recess 238 in cam 228 and near cam surface 236. Counting movement of dial 38 is in a counterclockwise direction and accordingly the nose of pawl 240 will be held away from cam 228 by block 252 until it is over cam surface 236. Dial 38 and associated parts will make a full revolution corresponding to substantially 5,000 revolutions of input shaft 44 before the nose of pawl 240 is in position to contact cam 228 and cause a resetting movement of the latches 196.

To summarize the resetting operation, the indicator 34 is rotated counterclockwise until arm 212 engages surface 224 on latch 214. This causes dial 38 to be rotated counterclockwise with indicator 34 until the nose of pawl 240 engages cam 228 and releases switch arms 148 from latches 196. It is necessary to move indicator 34 past zero in a counterclockwise direction a second time in order to insure that all parts are reset.

The next cycle of operation is initiated by actuating switch 188, see Fig. 11. In order to be sure that switch 188 is only momentarily energized thereby assuring that control of the circuits is released to switches 130 through 144 as quickly as possible, switch 188 is of the break-make-break type. More specifically switch 188 includes a housing 254 which slidably receives and supports an actuating arm 256. Arm 256 is normally urged to the left by a spring 258 mounted on housing 254. A spring actuator 260 is provided for switch 188 and bears against an actuator 262. Depression of actuator 262 or movement to the left as viewed in Fig. 11 closes switch 188. Closure of switch 188 is accomplished by rotating a toothed wheel 264 that is rotatably mounted upon a shaft 266. The teeth 268 on wheel 264 are so arranged that they will move arm 269 to the left thus moving actuator 262 to the closed position when wheel 264 is rotated in a clockwise direction. Switch 188 is held closed only as long as a point of a tooth 268 on wheel 264 bears against arm 269.

The necessary rotation of wheel 264 to actuate switch 188 is accomplished by moving arm 256 manually to the right. There is affixed to arm 256 a spring 270 whose free end contacts the teeth on wheel 264. Accordingly movement of arm 256 to the right causes spring 270 to rotate wheel 264 in a clockwise direction. The amount of movement of arm 256 is controlled by an abutment 272 formed thereon which contacts the housing 254. Arm 256 therefore can move only a small predetermined distance and this distance is such that one tooth of wheel 264 is rotated past spring arm 260 to close switch 188. Since switch 188 is closed only when a point of tooth 268 is in engagement with spring arm 260 switch 188 is immediately opened and remains open no matter how long arm 256 is held to the right. Release of arm 256 permits it to be moved under the influence of spring 258 to the left in position to again close switch 188.

The control device of this invention gives great flexibility of control since four control switches and associated parts are provided in the range from zero to 100 turns and four switches are provided in the range from 100 to 5,000 turns. A large number of coil sections can be wound on the same core by a single setting of the various control cams controlling the actuating switches. This makes it unnecessary for the operator to remember which coil is being wound at any particular time, continuation of the coiling operation simply being accomplished by pushing the switch 188 shown in Fig. 11 after the core has been reset. Operation of any of the switches can be by-passed or eliminated by setting them to be actuated immediately upon starting of the machine. Thus accurate and controlled operation of the coil winding machine or any other associated machine can be achieved.

It will be seen that there has been provided a counter and control device having the advantages and fulfilling the objects set forth above. Although a preferred form of the invention has been shown for the purposes of illustration, it is to be understood that various changes and modifications can be made therein without departing from the spirit and scope thereof. Accordingly, the invention is to be limited only as set forth in the following claims.

I claim:

1. A combination counter and control device comprising a first counter dial and pointer and a second counter dial and pointer, an input drive shaft, drive means interconnecting said drive shaft and said dials and pointers to cause relative rotation between said dials and pointers, said first dial and pointer recording units of revolution of said drive shaft and said second dial and pointer indicating multiple units of rotation of said drive shaft, a first group of control switches associated with said first dial and pointer and a second group of control switches associated with said second dial and pointer, and actuating means interconnecting said drive means and said control switches to cause actuation of said first group to control switches at predetermined positions of said first pointer with respect to said first dial and to cause actuation of said second group of control switches at predetermined positions of said second dial with respect to said second pointer.

2. A combination counter and control device comprising a first counter dial and pointer and a second counter dial and pointer, an input drive shaft, drive means interconnecting said drive shaft and said dials and pointers to cause relative rotation between said dials and pointers, said first dial and pointer recording units of revolution of said drive shaft and said second dial and pointer indicating multiple units of rotation of said drive shaft, a first group of control switches associated with said first dial and pointer and a second group of control switches associated with said second dial and pointer, actuating means interconnecting said drive means and said control switches to cause actuation of each control switch of said first group at a predetermined position of said first pointer with respect to said first dial and to cause actuation of each control switch of the second group at a predetermined position of said second dial with respect to said second pointer, and means independently to adjust the position at which each control switch is actuated.

3. A combination counter and control device comprising a first counter dial and pointer and a second counter dial and pointer, an input drive shaft, drive means interconnecting said drive shaft and said dials and pointers to cause relative rotation between said dials and pointers, said first dial and pointer recording units of revolution of said drive shaft and said second dial and pointer indicating multiple units of rotation of said drive shaft, a first group of control switches associated with said first dial and pointer and a second group of control switches associated with said second dial and pointer, actuating means interconnecting said drive means and said control switches to cause actuation of each control switch of said first group at a predetermined position of said first pointer with respect to said first dial and to cause actuation of each control switch of the second group at a predetermined position of said second dial with respect to said second pointer the order and the point of actuation of said switches being adjustable, and circuit means interconnecting said switches so that said switches control an associated electrical circuit in sequence, the first switch in said first group controlling the associated electrical circuit until actuated whereupon the next control switch controls the associated circuit, each control switch controlling the associated circuit in turn until all of the control switches are actuated.

4. A combination counter and control device comprising a first counter dial and pointer and a second counter dial and pointer, an input drive shaft, drive means interconnecting said drive shaft and said dials and pointers to cause relative rotation between said dials and pointers, said first dial and pointer recording units of revolution of said drive shaft and said second dial and pointer indicating multiple units of rotation of said drive shaft, a first group of control switches associated with said first dial and pointer and a second group of control switches associated with said second dial and pointer, actuating means interconnecting said drive means and said control switches to cause actuation of said control switches at predetermined positions of said pointers with respect to said dials, the point of actuation of each control switch being adjustable, said control switches being connected in series so that the first unactuated switch in the series controls an associated electrical circuit until actuated at which time the next control switch in series controls the associated electrical circuit, and means to hold each control switch in the actuated position.

5. A combination counter and control device comprising a first counter dial and a pointer and a second counter dial and pointer, an input drive shaft, drive means interconnecting said drive shaft and said dials and pointers to cause relative rotation between said dials and pointers, said first dial and pointer recording units of revolution of said drive shaft and said second dial and pointer indicating multiple units of rotation of said drive shaft, a first group of control switches associated with said first dial and pointer and a second group of control switches associated with said second dial and pointer, actuating means interconnecting said drive means and said control switches to cause actuation of each control switch of said first group at a predetermined position of said first pointer with respect to said first dial and to cause actuation of each control switch in the second group at a predetermined position of said second dial with respect to said second pointer, said control switches being connected in series, the first control switch in the first group controlling an associated electrical circuit until actuated by said actuating means, the next switch in the first group being effective to control the associated electrical circuit upon actuation of the preceding control switch in the first group, the first control switch in the second group controlling the associated electrical circuit after actuation of all of the switches in the first group, the next switch in the second group being effective to control the associated electrical circuit upon actuation of the preceding control switch in the second group, and resetting means to reset said control switches to place the first control switch of the first group in control of the associated electrical circuit.

6. A combination counter and control device comprising a frame, a first dial fixedly mounted upon said frame and a first pointer rotatably mounted upon said frame for cooperation with said first dial, a second dial rotatably mounted upon said frame and a second pointer fixedly mounted upon said frame for cooperation with said second dial, a pointer shaft rotatably mounted upon said frame and connected to said pointer, a dial shaft rotatably mounted upon said frame and connected to said second dial, an input shaft rotatably mounted upon said frame, drive means interconnecting said input shaft and said pointer shaft and said dial shaft to rotate said shafts in a predetermined relationship, a first group of control switches associated with said first dial and pointer and a second group of control switches associated with said second dial and pointer, a first set of actuators mounted upon said pointer shaft to be frictionally driven thereby and adjustable with respect thereto, a second set of actuators mounted for rotation about said dial shaft to be frictionally driven thereby and adjustable with respect thereto, said first set of actuators cooperating with said first group of switches to actuate said first group of switches at predetermined positions of said first pointer with respect to said first dial, the second set of actuators cooperating with said second group of control switches to actuate said second group of control switches at predetermined points of said second dial with respect thereto said second pointer, and means independently to adjust the position at which each control switch is actuated.

7. A combination counter and control device comprising a frame, a first dial fixedly mounted upon said frame and a first pointer rotatably mounted upon said frame for cooperation with said first dial, a second dial rotatably mounted upon said frame and a second pointer fixedly mounted upon said frame for cooperation with said second dial, a pointer shaft rotatably mounted upon said frame and connected to said pointer, a dial shaft rotatably mounted upon said frame and connected to said second dial, an input shaft rotatably mounted upon said frame, drive means interconnecting said input shaft and said pointer shaft and said dial shaft to rotate said shafts in a predetermined relationship, a first group of control switches associated with said first dial and pointer and a second group of control switches associated with said second dial and pointer, a first set of actuators mounted upon said pointer shaft to be frictionally driven thereby and adjustable with respect thereto, a second set of actuators mounted for rotation about said dial shaft to be frictionally driven thereby and adjustable with respect thereto, said first set of actuators cooperating with said first group of switches to actuate said first group of switches at predetermined positions of said first pointer with respect to said first dial, the second set of actuators cooperating with said second group of control switches to actuate said second group of control switches at predetermined points of said second dial with respect thereto said second pointer, said control switches being connected in series, the first control switch in the series controlling an associated electrical circuit until actuated by the associated actuator, the next switch being effective to control the associated electrical circuit upon actuation of the preceding control switch in the series, and means to hold said switches in the actuated position when once actuated.

8. A combination counter and control device comprising a frame, a first dial fixedly mounted upon said frame and a first pointer rotatably mounted upon said frame for cooperation with said first dial, a second dial rotatably mounted upon said frame and a second pointer fixedly mounted upon said frame for cooperation with said second dial, a pointer shaft rotatably mounted upon said frame and connected to said pointer, a dial shaft rotatably mounted upon said frame and connected to said second dial, an input shaft rotatably mounted upon said frame, drive means interconnecting said input shaft and said pointer shaft and said dial shaft to rotate said shafts in a predetermined relationship, a first group of control switches associated with said first dial and pointer and a second group of control switches associated with said second dial and pointer, a first set of actuators mounted upon said pointer shaft to be frictionally driven thereby and adjustable with respect thereto, a second set of actuators mounted for rotation about said dial shaft to be frictionally driven thereby and adjustable with respect thereto, said first set of actuators cooperating with said first group of switches to actuate said first group of switches at predetermined positions of said first pointer with respect to said first dial, the second set of actuators cooperating with said second group of control switches to actuate said second group of control switches at predetermined points of said second dial with respect thereto said second pointer, said control switches being connected in series, the first control switch in the series controlling an associated electrical circuit until actuated by the associated actuator, the next switch in the series being effective to control the associated electrical circuit upon actuation of the preceding control switch in the series, and resetting means to reset said control switches to place the first control switch of the series in control of the associated electrical circuit.

9. A combination counter and control device comprising a frame, a first dial fixedly mounted upon said frame and a first pointer rotatably mounted upon said frame for cooperation with said first dial, a second dial rotatably mounted upon said frame and a second pointer fixedly mounted upon said frame for cooperation with said second dial, a pointer shaft rotatably mounted upon said frame and connected to said pointer, a dial shaft rotatably mounted upon said frame and connected to said second dial, an input shaft rotatably mounted upon said frame, drive means interconnecting said input shaft and said pointer shaft and said dial shaft to rotate said shafts in a predetermined relationship, a first group of control switches associated with said first dial and pointer and a second group of control switches associated with said second dial and pointer, a first set of actuators mounted upon said pointer shaft to be frictionally driven thereby and adjustable with respect thereto, a second set of actuators mounted for rotation about said dial shaft to be frictionally driven thereby and adjustable with respect thereto, said first set of actuators cooperating with said first group of switches to actuate said first group of switches at predetermined positions of said first pointer with respect to said first dial, the second set of actuators cooperating with said second group of control switches to actuate said second group of control switches at predetermined points of said second dial with respect thereto said second pointer, the control switches of the first group being connected in series and the control switches of the second group being connected in series and the first series of control switches being connected in series with the second group of control switches, the first control switch in the series controlling an associated electrical circuit until actuated by the associated actuator, the next switch in the series being effective to control the associated electrical circuit upon actuation of the preceding control switch in the series, means to hold said control switches in the actuated position, and resetting means to reset said control switches to place the first control switch in control of the associated electrical circuit when the dials and pointers are returned to the reset position.

10. A combination counter and control device comprising a frame, a first dial fixedly mounted upon said frame and a first pointer rotatably mounted upon said frame for cooperation with said first dial, a second dial rotatably mounted upon said frame and a second pointer fixedly mounted upon said frame for cooperation with said second dial, a pointer shaft rotatably mounted upon said frame and connected to said pointer, a dial shaft rotatably mounted upon said frame and connected to said second dial, an input shaft rotatably mounted upon said frame, drive means interconnecting said input shaft and said pointer shaft and said dial shaft to rotate said shafts in a predetermined relationship, a first group of control switches associated with said first dial and pointer and a second group of control switches associated with said second dial and pointer, a first set of actuators mounted upon said pointer shaft to be frictionally driven thereby and adjustable with respect thereto, a second set of actuators mounted for rotation about said dial shaft to be frictionally driven thereby and adjustable with respect thereto, said first set of actuators cooperating with said first group of switches to actuate said first group of switches at predetermined positions of said first pointer with respect to said first dial, the second set of actuators cooperating with said second group of control switches to actuate said second group of control switches at predetermined points of said second dial with respect thereto said second pointer, said control switches being connected in series, each of said control switches having a first operative position in which the control switch is effective to control an associated electrical circuit and a second operative position in which the control switch places the next control switch in position to control the associated electrical circuit, a latch mounted on said frame for each of said control switches, each of said latches holding the associated control switch in the second operative position when actuated by the associated cam surface, and latch release means mounted on said frame and operative to release said control switches from said latches to return said control switches to the first operative position upon resetting of said pointers and dials to the zero position.

References Cited in the file of this patent
UNITED STATES PATENTS

| | | |
|---|---|---|
| 2,295,968 | Poole | Sept. 15, 1942 |
| 2,348,141 | Luhn | May 2, 1944 |
| 2,508,064 | Hazard | May 16, 1950 |
| 2,514,174 | Adshead | July 4, 1950 |
| 2,574,283 | Potter | Nov. 6, 1951 |